Feb. 15, 1927. 1,618,034
W. I. WILLIAMS ET AL
VALVE
Filed April 9, 1923   3 Sheets-Sheet 1

W. I. Williams
Ray Reeder
INVENTOR

BY Victor J. Evans
ATTORNEY

WITNESS:

Feb. 15, 1927.                                                         1,618,034
                         W. I. WILLIAMS ET AL
                                VALVE
                         Filed April 9, 1923      3 Sheets-Sheet 2
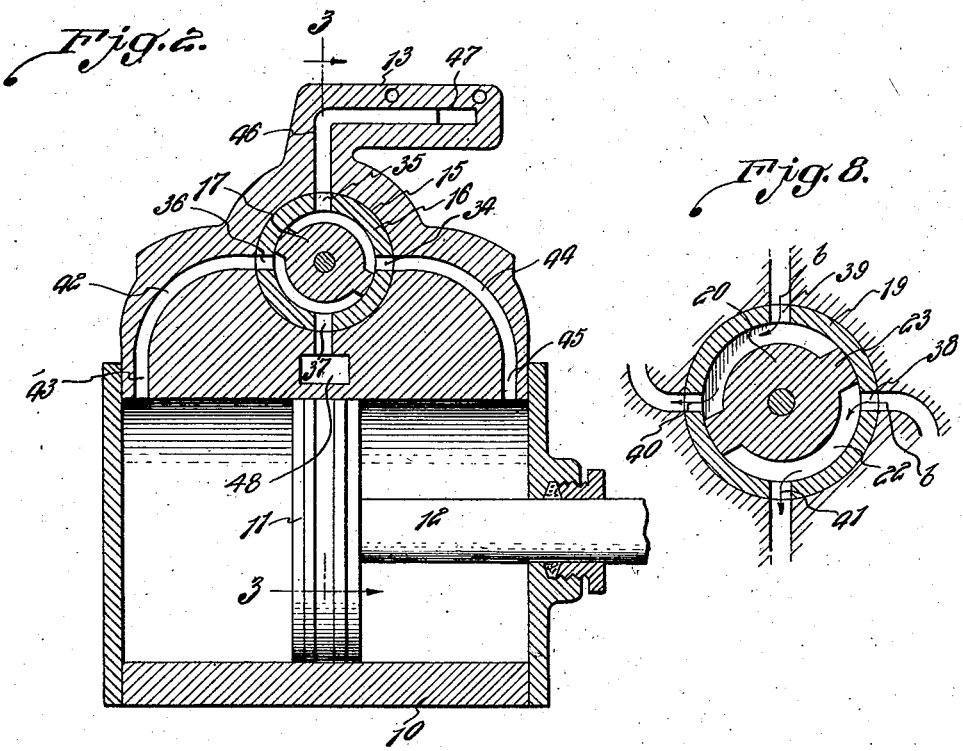
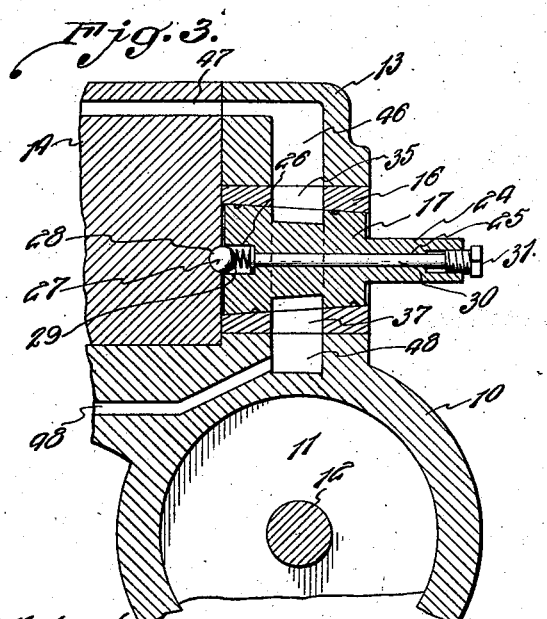
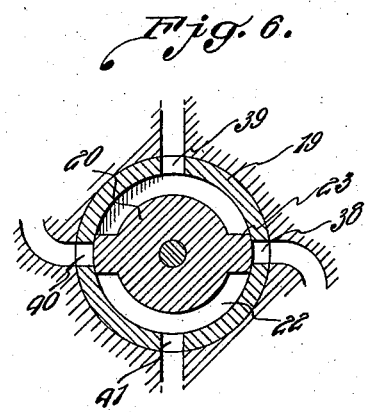
W. I. Williams
Ray Reeder
INVENTOR
BY Victor J. Evans
ATTORNEY Feb. 15, 1927.
W. I. WILLIAMS ET AL
1,618,034
VALVE
Filed April 9, 1923   3 Sheets-Sheet 3

W. I. Williams
Ray Reeder
INVENTOR

BY Victor J. Evans
ATTORNEY

Patented Feb. 15, 1927.

1,618,034

UNITED STATES PATENT OFFICE.

WESLEY I. WILLIAMS AND RAY REEDER, OF WICHITA, KANSAS.

VALVE.

Application filed April 9, 1923. Serial No. 630,992.

This invention relates to improvements in engines and has particular relation to means for controlling the admission of steam or other expansible fluid to the cylinder or cylinders of an engine and for controlling the exhaust therefrom.

An object of the present invention is the provision of a novel form of controlling or feed valve and reversing valve, together with an arrangement of intake and exhaust ports, whereby either a single or multiple cylinder engine may be started, stopped, or reversed by a single operation of a controlling lever, while tendency of the engine to stop on dead center is materially reduced.

Another object of the invention is the provision of a valve having novel means of adjustment for taking up wear, together with means whereby the valve may be lubricated to insure its proper operation.

With the above and other objects in view, the invention further includes the following novel features and details of construction, to be hereinafter more fully described, illustrated in the accompanying drawings and pointed out in the appended claim.

In the drawings:—

Figure 2 is a sectional view on the line 2—2 of Figure 1.

Figure 3 is a section on the line 3—3 of Figure 2.

Figure 5 is a detail perspective view of one of the valves.

Figure 6 is a diagram illustrating the closed position of the feed controlling valve.

Figures 7 and 8 are similar views showing different positions of this valve.

Figure 1:
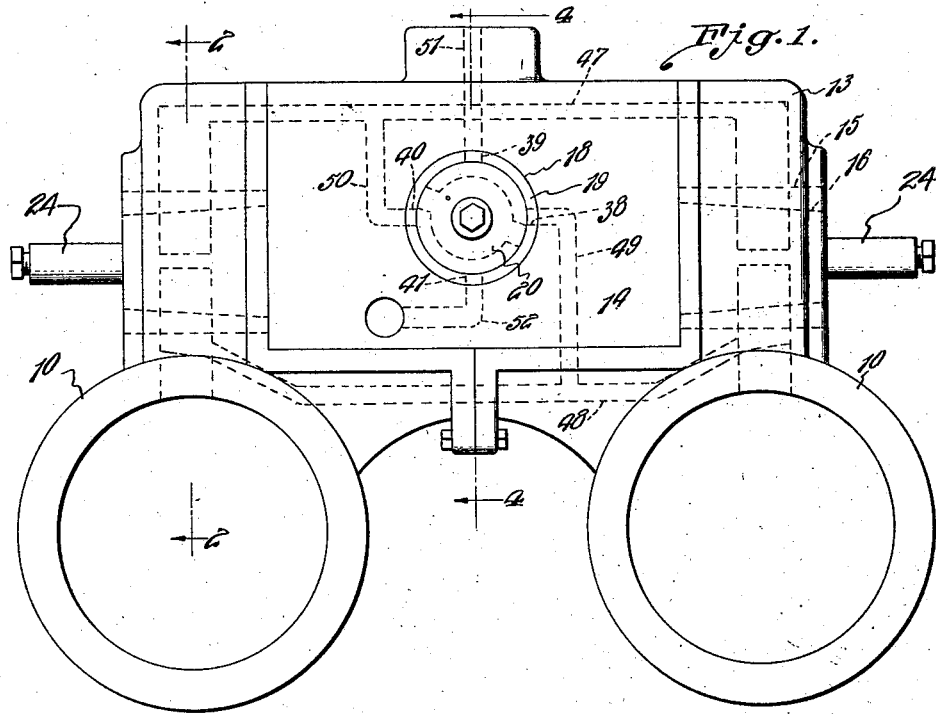
Figure 1 is a sectional view through a multiple cylinder engine constructed in accordance with the invention, parts being shown by dotted lines and other parts omitted.

Referring in detail to the drawings, wherein like characters of reference denote corresponding parts, the reference character 10 indicates the cylinders of an engine within which operates a piston 11, the rod 12 of the latter being connected with a drive shaft (not shown).

The cylinders 10 have extending therefrom a casting 13 and these castings are connected by a block 14 so as to provide a unitary structure.

Formed in each of the castings 13 is a transverse opening 15, within which is seated a tapered sleeve 16, the latter forming a seat for a valve 17, which is hereinafter referred to as a working valve.

Also formed within the block 14 is an opening 18 and located within this opening is a tapered sleeve 19 which is similar to the sleeve 16 previously mentioned. This sleeve 19 is also tapered and provides a valve seat for a feed controlling valve 20.

Figures 5, 7:
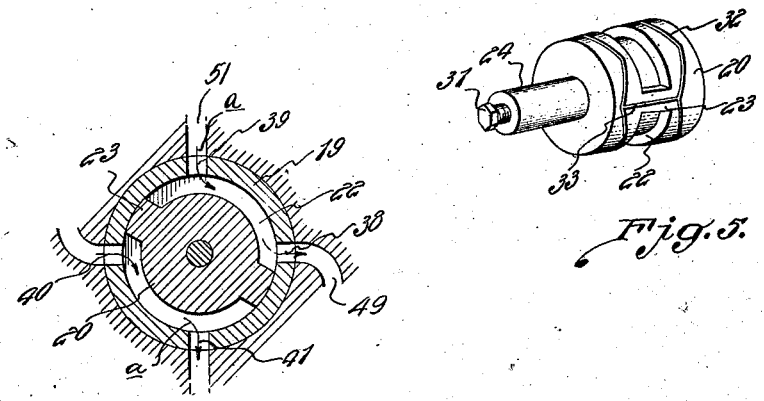
Figure 4:
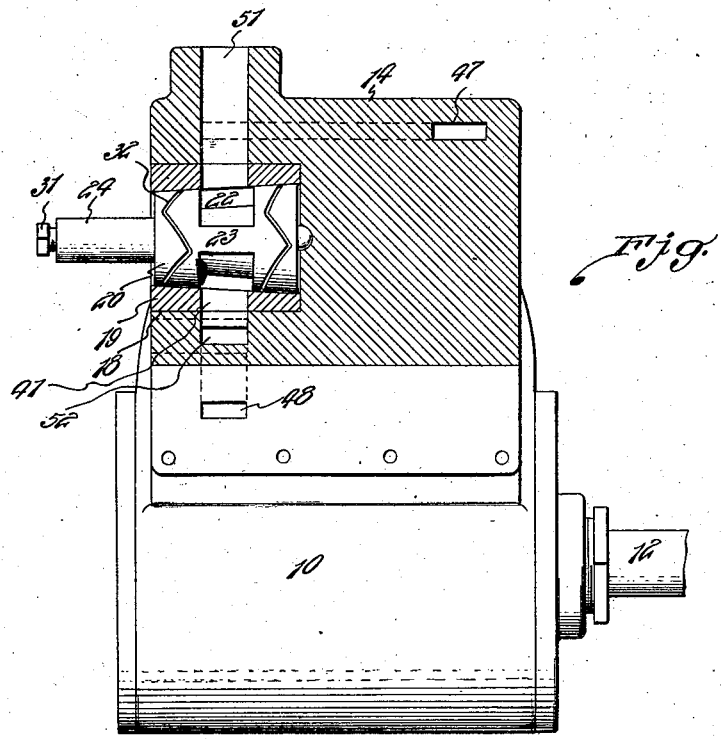
Figure 4 is a section on the line 4—4 of Figure 1.

The valves 17 and 20 are of similar construction and are illustrated in detail in Figure 5 of the drawings. They include a tapered plug 17 which is provided with transversely arranged oppositely located passages 22, the said passages being separated by a flange 23. A stem 24 extends from the smaller end of the tapered plug 20, while a bore 25 extends axially through the valve. One end of the bore 25 is enlarged as at 26 and is adapted to receive a ball 27, the latter extending beyond the end of the valve when the said valve is in position and having a bearing in a socket 28 provided in the block 14. A spring 29 which is located within the enlarged portion 26 of the bore bears against a shoulder at the inner end of the bore and acts to force the valve upon its seat. A rod 30 extends from the bore 25 and the outer end of this rod is movable longitudinally of the bore by means of an adjusting screw 31, whereby the spring may be tensioned to take up wear between the valve and its seat.

The valves 17 and 20 are of the oscillating type and may be operatively connected by any suitable means to the engine crank shaft and as the connecting means forms no part of the present invention, none are illustrated.

The tapered plug of the valve is provided with circumferentially arranged zig-zag grooves 32, which are spaced apart and connected by means of a longitudinally disposed groove 33, the said grooves being adapted to contain lubricant so that the valves may at all times be properly lubricated.

By means of these tapered valves mounted in the manner illustrated and described, there is a tendency of the said valves to move toward their larger ends, due to steam or other fuel pressure, thereby providing a balance valve which will operate freely under high pressure.

The sleeves 16 of the valves 17 are provided with tapered outer surfaces so as to snugly fit within the openings 15 which are likewise tapered and in addition, the bores of these sleeves are similarly tapered, their smaller ends being disposed outwardly. The sleeve of the valve 20 is preferably similarly formed. The sleeves 16 of the valves 17 are provided with spaced diametrically arranged ports 34, 35, 36 and 37, while the sleeve of the valve 20 is provided with similarly arranged ports 38, 39, 40 and 41.

The ports 36 of the sleeves of the working valves 17 are in communication with a passage 42 provided in the casting 13, the opposite end of this passage being in communication with a port 43 at one end of the cylinder 10. The opposite ports 34 of the working valves 17 are in communication with one end of a passage 44, also provided in the castings 13 and whose opposite end is in communication with a port 45 at the end of the cylinder opposite the port 43. The ports 35 of the working valves 17 are in communication with upwardly extending passages 46 and the upper ends of these passages are connected by a horizontally arranged passage 47. The ports 37 of the working valves communicate with the opposite ends of a horizontally arranged passage 48, while this last mentioned passage is in communication with one end of a passage 49, whose opposite end is in communication with the port 38 of the valve 20. The port 40 of this last mentioned valve communicates with the passage 47 through a passage 50, while the port 39 communicates with a passage 51. The port 41 communicates with a passage 52 which provides an exhaust passage.

With the working valve in the dotted line position shown in Figure 1 of the drawings and the fuel line position in Figure 7, steam entering through the passage 51 will pass through the port 39, one of the passages 22 of the valve 20, the port 38, through the passage 49, and in opposite directions through the passage 48, as illustrated by the arrows. From the opposite ends of the passage 48, the steam will pass through the ports 37 of the working valves 17, through one of the passages 22 of the said valve, through the port 26, the passage 42 the port 33 into the cylinders 10 to one side of the piston 11, as illustrated by the arrows in Figure 2. This will force the piston in the direction of the arrow shown in this figure and dead steam will be forced outward through the port 45, the passage 44, the port 34, through one of the passages 22 of the working valve 17, through the port 35, the passages 46 and 47, the passage 50, one of the passages 22 of the valve 20, and out through the exhaust passage 52.

The direction of operation of the engine and its speed is controlled by the valve 20, the crank shaft rotating in one direction when live steam passes through the valve 20 as indicated by the arrows $a$ in Figure 7, the exhaust steam passing outward through the valve as indicated by the arrows $b$. When the position of this valve is reversed as shown in Figure 8, live steam will pass through the valve 20 in the direction shown by the arrows $a$ so as to enter the cylinders 11 through the ports 45 and reverse the direction of operation of the crank shaft. The direction of travel of the exhaust is indicated by the arrows $b$ in Figure 8.

When the valve 20 is in the position shown in Figure 6, steam is entirely cut off to the cylinders so that no operation of the engine will occur and it will be noted by reference to this figure that when the valve is rotated in either direction to open the ports 38 and 40, the exhaust passages will be opened first and to a greater degree than the live steam passages so as to permit of a thorough exhaust of steam when the engine is running at either high or low speed. The speed of the engine may be controlled by means of the valve 20.

Figure 9:
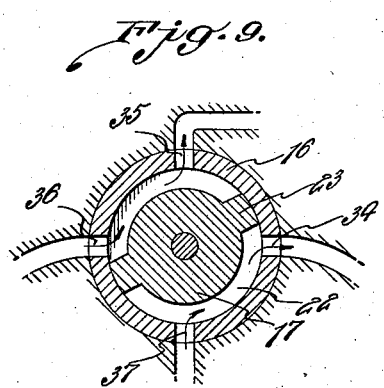
Figures 9 and 10 are diagrammatic views showing different positions of the working valve.
Figure 10:
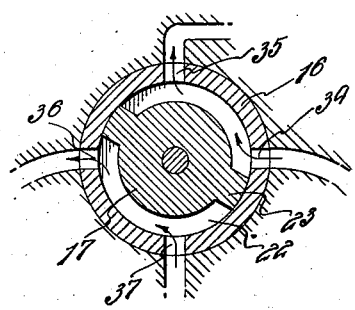

In Figures 9 and 10 there is illustrated different positions of the working valves 17 during their oscillating movement, whereby the passages 42 and 44 are alternately opened and closed.

The invention is susceptible of various changes in its form, proportions and minor details of construction and the right is herein reserved to make such changes as properly fall within the scope of the appended claim.

Having described the invention what is claimed is:—

A rotary valve for use upon and in conjunction with cylinder engines for controlling the intake and exhaust of steam therefor, said valve tapering longitudinally of its length and seated within a corresponding shaped sleeve arranged within a controlling port in the engine, said valve providing oppositely disposed flange portions upon its opposite sides and defining transversely arranged oppositely located passages upon its opposite sides for selective communication and registration with auxiliary intake and exhaust ports communicating with the first mentioned port and sleeve, the inner enlarged end of the valve having a socket provided therein and seating a spring pressed ball, and an adjusting rod extending centrally through the valve and connected to said spring for regulating its tension upon the ball for adjusting the valve to eliminate escape of either the intake or exhaust steam within the controlling port.

In testimony whereof we affix our signatures.

WESLEY I. WILLIAMS.
RAY REEDER.